United States Patent
Haese et al.

(10) Patent No.: US 6,963,364 B2
(45) Date of Patent: Nov. 8, 2005

(54) METHOD OF IMPROVING A SIGNAL IN A SEQUENCE OF IMAGES ACQUIRED WITH A DIGITAL COLOR VIDEO CAMERA

(75) Inventors: Juergen Haese, Gleichen (DE); Stephan Weyh, Goettingen (DE)

(73) Assignee: KAPPA opto-electronics GmbH (DE)

( * ) Notice: Subject to any disclaimer, the term of this patent is extended or adjusted under 35 U.S.C. 154(b) by 809 days.

(21) Appl. No.: 10/025,948

(22) Filed: Dec. 19, 2001

(65) Prior Publication Data

US 2002/0080262 A1 Jun. 27, 2002

(30) Foreign Application Priority Data

Dec. 22, 2000 (DE) .......................... 100 64 678

(51) Int. Cl.$^7$ .................................................. H04N 9/68
(52) U.S. Cl. ..................................... 348/235; 348/229.1
(58) Field of Search .......................... 348/223.1, 222.1, 348/225.1, 229.1, 234, 235, 236, 237, 238, 241, 252, 254, 255; 382/270, 272, 273, 274

(56) References Cited

U.S. PATENT DOCUMENTS

| | | | | |
|---|---|---|---|---|
| 4,187,519 A | * | 2/1980 | Vitols et al. ................ | 348/28 |
| 4,933,750 A | | 6/1990 | Lee .............................. | 358/34 |
| 5,517,333 A | * | 5/1996 | Tamura et al. ............. | 358/518 |
| 5,870,154 A | * | 2/1999 | Conover et al. ............ | 348/673 |
| 6,111,607 A | * | 8/2000 | Kameyama ................. | 348/256 |
| 2003/0193579 A1 | * | 10/2003 | Mori et al. ................. | 348/222.1 |
| 2004/0051790 A1 | * | 3/2004 | Tamaru et al. ............. | 348/223.1 |
| 2004/0183924 A1 | * | 9/2004 | Hannah ...................... | 348/229.1 |
| 2004/0201730 A1 | * | 10/2004 | Tamura ...................... | 348/229.1 |
| 2004/0201731 A1 | * | 10/2004 | Kakinuma et al. ......... | 348/229.1 |
| 2005/0012866 A1 | * | 1/2005 | Chiang et al. .............. | 348/625 |

FOREIGN PATENT DOCUMENTS

| | | | |
|---|---|---|---|
| DE | 3714861 C2 | 2/1989 | |
| DE | 4313621 C2 | 9/1995 | |
| EP | 0 390 179 A1 | 10/1990 | ............. H04N/5/57 |
| EP | 1 052 848 A1 | 11/2000 | ........... H04N/5/235 |
| FR | 2 648 302 A1 | 12/1990 | ........... H04N/5/243 |

* cited by examiner

Primary Examiner—Wendy R. Garber
Assistant Examiner—Jacqueline Wilson
(74) Attorney, Agent, or Firm—Thomas, Kayden, Horstemeyer & Risley, LLP

(57) ABSTRACT

A method of improving a signal in an image sequence acquired with a digital color video camera creating a digital video signal (1) including a brightness signal component (3) and a color signal component (4) includes the steps (6, 7) of continuously evaluating the brightness signal component (3) to calculate maximum brightness values and minimum brightness values at least within a first predetermined image sector and at least for a partial sequence of images, continuously calculating offset values on the basis of at least two previously calculated minimum brightness values, continuously calculating gain values based on differences between at least to previously calculated maximum brightness values and the associated minimum brightness values, continuously modifying the brightness signal component (3) by subtracting the last calculated offset value therefrom and by then multiplying it with the last gain value, and continuously modifying the color signal component (4) by multiplying it with the last calculated gain value and a predetermined weighting factor at least for a second predetermined image sector.

25 Claims, 1 Drawing Sheet

METHOD OF IMPROVING A SIGNAL IN A SEQUENCE OF IMAGES ACQUIRED WITH A DIGITAL COLOR VIDEO CAMERA

CROSS REFERENCE TO RELATED APPLICATIONS

This application claims the benefit of co-pending German Patent Application No. 100 64 678.6-31 entitled "Verfahren zur Signalverbesserung in einer mit einer digitalen Farbvideokamera aufgenommenen Bilderfolge", filed on Dec. 22, 2000.

FIELD OF THE INVENTION

The present invention generally relates to a method of improving a signal in an image sequence acquired with a digital color video camera. More particularly, the present invention relates to a method in which the color video camera creates a digital video signal consisting of a brightness signal component and a color signal component.

BACKGROUND OF THE INVENTION

Digital color video cameras which create a digital video signal consisting of a brightness signal component and a color signal component are known in the art. The two signal components are immediately transformed into an analog color video signal. The analog video signal is suitable for the conventional transmission of video signals and for the conventional display of an image sequence on an ordinary TV monitor.

A modern digital color video camera based on so called CCD technology in its brightness range has a typical resolution of 8, 10 or 12 bits. This means it is capable of recording 255, 1023 or 4095 levels of brightness. In contrast, the brightness resolution of the human eye is very limited. The difference in brightness of two neighboring picture elements has to be approximately 1 to 2 percent to be recognized. A brightness resolution of more than 7 bits (which corresponds to 127 levels of brightness) does not produce a visible quality improvement when displaying images.

At the same time, pictures rarely show regions with a brightness value of zero and/or a maximum value. In other words, often there are no purely black and/or white regions in an image.

Submitting single images to a digital image processing procedure raises the contrast in such pictures. In order to achieve this, the generally analog color video signal has to be digitized first. Then, a maximum and a minimum brightness value are calculated in each image. An offset value and a gain value are determined therefrom. Then, the image data are modified by subtracting the offset value therefrom and by multiplying them with the gain value such that they span all the possible levels of brightness as fully as possible.

This known digital image processing existing in software does not—with a reasonable expenditure for hardware—increase the contrast in a sequence of images acquired with a digital color video camera to display them in real-time on a color monitor. However this is often demanded, for example, in real-time surveillance of objects or during the observation of endoscopic procedures during surgery.

A method of increasing the contrast in a sequence of images acquired with a black-and-white video camera is known. An analog video signal is processed with a hardware circuit at the camera output, and it is put out as a processed analog video signal. A hardware solution like this is offered by ADIMEC. The known process is not suitable for analog color video signals, and it can therefore not be used with a color video camera.

SUMMARY OF THE INVENTION

The present invention relates to a method of improving a signal in an image sequence acquired with a digital color video camera in real-time. The color video camera creates a digital video signal including of a brightness signal and a color signal. The method results in a boost in contrast greater than the of other known methods at the current level of technology. The present invention also relates to software for performing the method.

The method at least includes the following steps:

continuously evaluating the brightness signal component to calculate maximum brightness values and minimum brightness values at least within a first predetermined image sector and at least for a partial sequence of images, continuously calculating offset values on the basis of at least two previously calculated minimum brightness values, continuously calculating gain values based on differences between at least to previously calculated maximum brightness values and the associated minimum brightness values, continuously modifying the brightness signal component by subtracting the last calculated offset value therefrom and by then multiplying it with the last gain value, and continuously modifying the color signal component by multiplying it with the last calculated gain value and a predetermined weighting factor at least for a second predetermined image sector.

The novel method is immediately applied to the digital video signal consisting of a brightness signal component and a color signal component. The two signal components are created by a digital video camera before the digital signal is converted into an analog video signal. In some camera types, the digital video signal is called YUV signal. The brightness signal component is called the Y-signal component, and the color component is called UV signal component or also color difference signal. This digital video signal in a color video camera can already be submitted to an offset value subtraction and/or a gain value multiplication with basically adjustable constant offset and gain values for the duration of a sequence of images before performing the new method on it. This is the case in the function array of a commercially available color video camera. These initial steps are not of great importance to the present invention. They can be applied with the novel method in the regular way, or they may be completely omitted.

The novel method performs dynamic subtraction of offset values and multiplication of gain values, the offset values and the gain values being continuously calculated. The calculation of the new offset value and of the new gain value is realized in a known way using the minimal brightness value and maximum brightness value in an image or in a predetermined image sector or section. However, the novel method substantially differs from the known image processing software by taking into account not only the minimum brightness value and the maximum brightness value of a single image or a image section, but also at least a further set of previously calculated brightness values to determine a specific brightness value. In this way, "jumping" of the offset values and of the gain values in the sense of brightness flickering is prevented. These novel steps also mean that the offset value and the gain value being used to modify a certain image are at least in part calculated using image data from previous images. Furthermore, to limit complexity of the novel method and to increase its real-time capability without special expenditure in hardware, it is possible to limit evaluation of the digital video signal and correspondingly the continuous calculation of the offset value and the gain value to a part of the whole image sequence. This means that not every image of the image sequence is evaluated and, accordingly, the offset value and the gain value does not change with each new image of the image sequence. Moreover, the single images of the image sequence would have to be delayed to modify them with the immediately corresponding offset and gain value. These have to be calculated first from the images. With the novel method, it is preferred to avoid the delay. The novel method uses the last calculated offset value and the last calculated gain value for the modification of the current image, even if these were entirely taken from the previous images. It turns out that the offset values and the gain values that are based on at least two images do no differ so strongly that one can discern visible deficiencies in those images that have their contrasts increased. Instead, it has been found out that the novel method generates a boost in contrast very effectively. The difference between objects in the images is substantially improved, even if the human eye cannot discern these differences in image sequences that are not modified. This is particularly the case when the color video camera acquires an image sequence under adverse optical conditions, for example during foggy conditions outside or when there is steam in a body cavity. For the high efficiency of the boost in contrast, it also is of importance that the novel method directly influences the digital video signal as originally created by the video camera. This means that there is no loss of brightness information before the novel method is applied. In this way, the desired boost in contrast may be realized.

The novel method may include the step of smoothing the brightness signal component before its evaluation by calculating an average value of a predetermined number of neighboring picture elements. It is a known phenomenon that digital video cameras have so called pixel defects. The defective pixels always put out a constant brightness which does not represent the image information assigned to this pixel. To suppress the effect of these defect pixels, it is sufficient to smooth the brightness signal component through averaging. This procedure also prevents unwanted time-related fluctuations of the calculated brightness values derived from the offset values and the gain values which arise from the natural variation of brightness registered by each pixel. When the brightness signal component is successively or serially processed, it has been found to be especially easy to calculate an average of about ten horizontally neighboring pixels, and to further process the resulting average values as a smoothed brightness signal component.

In the step of continuously evaluating the brightness signal component, the maximum brightness value and the minimum brightness value may be evaluated within the first image sector. The predetermined image sector preferably corresponds to an area of particular interest. It is chosen such that it is free from any camera-generated insertion of additional information, orientation marks or the like, which could impair the novel method when the insertions are already contained in the digital video signal processed by the novel method. Usually, each image of the image sequence includes two frames. In the step of continuously evaluating the brightness signal component, it is also possible to evaluate the maximum brightness value and the minimum brightness value approximately within one entire frame.

The predetermined section or sector from which the maximum brightness values and the minimum brightness values are calculated can be identical to the specified section for which the digital video signal is modified. However, it is also possible to use the calculated brightness from the predetermined image section to modify the whole digital video signal or the video signal of another predetermined image section. The coordination of the two image sections can be optimized depending on the conditions of the given situation. Each of the predetermined image sectors may generally be freely chosen, but it may be fix with respect to at least a few frames.

When the brightness signal component is continuously evaluated, calculating the maximum brightness value and the minimum brightness value for every second or other frame in the digital video signal has been found to be advantageous. Compared to working with each frame, this procedure reduces the amount of data to be evaluated to 50 percent. However, the brightness values are still close enough with respect to time to prevent detection of any gaps or jumps in the display of the modified video signal.

In the step of continuously calculating offset values, these offset values may calculated on the basis of differences between the calculated minimum brightness values and a predetermined brightness value corresponding to zero brightness. As a result, a pixel having the minimum brightness value will get the brightness value 0 (zero) in the modified video signal.

The brightness values which are the basis for the continuous calculation of the offset values and/or the brightness values which are the basis for the continuous calculation of the gain values may be weighted differently. Preferably, the last calculated brightness values have the most weight. The current offset value and the current gain value may also simply be the average value of the values derived from the last evaluated frames. However, it is preferred to place less weight on those values that have been calculated earlier so that the last calculated values are taken into account most strongly.

The gain values may be calculated on the basis of quotients of a predetermined difference value corresponding to a maximum brightness resolution and differences between the previously calculated maximum brightness values and the associated minimum brightness values. Thus, the actual difference of the brightness values is stretched to the maximum brightness resolution.

When practically applying the novel method, at least the step of continuously evaluating the brightness signal component, the step of continuously modifying the brightness signal component and the step of continuously modifying the color signal component may be realized by hardware. The hardware preferably includes a programmable logic IC ("EPLD"). The calculation of the current offset value and of the current gain value, however, is best being done with a micro controller to allow for possible adjustments. But it is also possible to permanently associate these functions with the EPLD.

An analog video signal may be created from the modified digital video signal to display the image sequences on a color monitor. Especially, the color monitor may be a conventional TV monitor.

The novel method is particularly suitable to record image sequences of a medical procedure in a body cavity with a camera. The image sequence is displayed in real-time to the operating surgeon. In this situation, the novel method has the effect of optimizing the camera parameters instead of subsequent image processing procedures which adulterates the image sequence and which are met with fundamental reservation in the medical field.

Other features and advantages of the present invention will become apparent to one with skill in the art upon examination of the following drawing and the detailed description. It is intended that all such additional features and advantages be included herein within the scope of the present invention, as defined by the claims.

BRIEF DESCRIPTION OF THE DRAWING

The invention can be better understood with reference to the following drawing. The components in the drawing are not necessarily to scale, emphasis instead being placed upon clearly illustrating the principles of the present invention.

DETAILED DESCRIPTION

Figure 1:
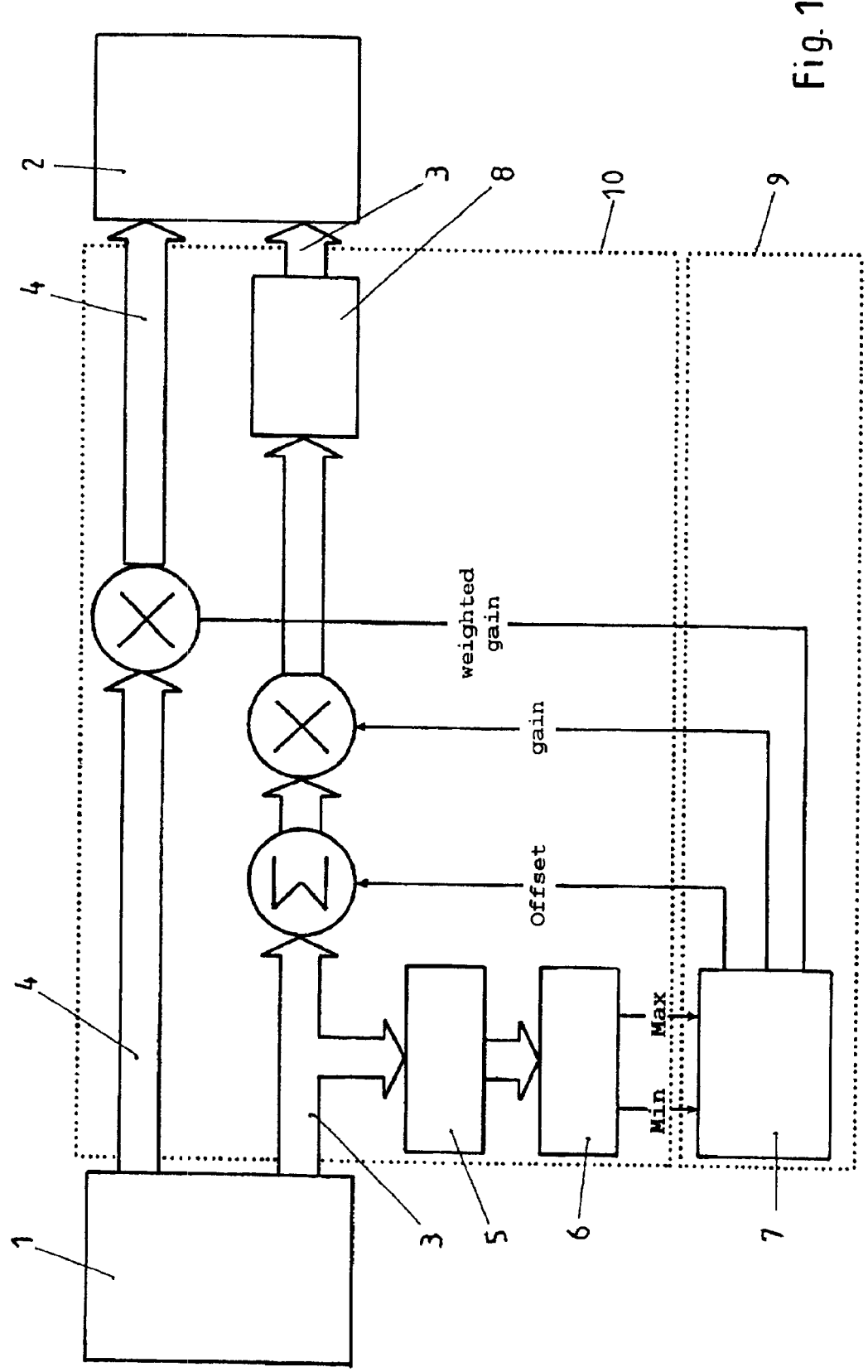
FIG. 1 is a diagram for conducting the novel method.

Referring now in greater detail to the drawings, FIG. 1 illustrates the principle of the novel method which starts from a digital video signal 1, and which outputs a modified video signal 2. In the illustrated exemplary embodiment, both video signals 1 and 2 are YUV signals of the type 4:2:2 according to video standard ITU-R BT.601/656. These digital video signals contain a brightness signal component 3 and a color signal component 4. The brightness signal component—which in this case is the Y component—according to ITU-R BT.601/656 has a value in the range of between 16 to 254, while the color signal—which in this case is the UV component and which is also called color difference signal—has values in a range of between 16 to 240. The latter value range (16–240) corresponds to 128±112, the value 128 representing a non-colored picture element.

The brightness signal component 3 is split to obtain a branch that can be evaluated. In this branch, step 5 levels or smoothens the signal by averaging over approximately eight horizontal consecutive picture elements. Then, step 6 calculates the maximum brightness value and the minimum brightness value either within the whole picture or within a specified predetermined image section for every other field or frame. These values are used in step 7 to calculate and to continuously update an offset value and a gain value. For the offset value, the following applies:

Offset($i$)=(100−$w$)100*Ymin($i$)+$w$/100*Ymin($i$ −1),

Ymin(i) being the minimum brightness value in field i.
The gain value is calculated in the following way:

gain=(100−$w$)/100*238/[Ymax($i$)−Ymin($i$)]+$w$/100*238/[Ymax($i$−1)−Ymin($i$−1)], Ymax(i) being the maximum brightness value in the field. w is an adjustable weight factor which determines how much the second to last evaluated field goes into the current offset value. Typically, it is between approximately between 10 to 50 percent.

The brightness signal component 3 is modified with the in this way calculated offset values and gain values by first subtracting the offset value and then multiplying with the gain value. The color signal component 4 is only multiplied with the gain, the gain being optimized by an adjustable factor n which typically is between approximately 10 and 100 percent. It is furthermore possible to apply a gamma correction 8 to the modified brightness signal component 3.

Except for step 7 which preferably puts out direct integers for the subtraction of the offset and for the multiplication with the gain and which is preferably executed by a micro controller, all other steps of the method preferably are executed by a programmed EPLD that is digital hardware.

The novel method as so far described results in a considerable increase in contrast. This increase particularly occurs in case the method is applied to a sequence of images acquired by a digital color camera, the images originally having a very low contrast due to fog or steam in front of the image objects or due to unfavorable lighting conditions.

FIG. 1 does not illustrate the possibility of the novel method to reduce the increase in contrast by subtraction of the offset and multiplication with the gain to a predetermined image sector. In such a case, evaluation according to step 6 can be applied to this image sector.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of improving a signal in an image sequence acquired with a digital color video camera creating a digital video signal including a brightness signal component and a color signal component, said method comprising the steps of:

continuously evaluating the brightness signal component to calculate maximum brightness values and minimum brightness values at least within a first predetermined image sector and at least for a partial sequence of images;

continuously calculating offset values on the basis of at least two previously calculated minimum brightness values;

continuously calculating gain values based on differences between at least to previously calculated maximum brightness values and the associated minimum brightness values;

continuously modifying the brightness signal component by subtracting the last calculated offset value therefrom and by then multiplying it with the last gain value; and continuously modifying the color signal component by multiplying it with the last calculated gain value and a predetermined weighting factor at least for a second predetermined image sector.

2. The method of claim 1, further comprising the step of smoothing the brightness signal component before its evaluation by calculating an average value of a predetermined number of neighboring picture elements.

3. The method of claim 1, wherein in the step of continuously evaluating the brightness signal component the maximum brightness value and the minimum brightness value are evaluated within the first image sector.

4. The method of claim 2, wherein in the step of continuously evaluating the brightness signal component the maximum brightness value and the minimum brightness value are evaluated within the first image sector.

5. The method of claim 1, wherein each image of the image sequence includes two frames, and wherein in the step of continuously evaluating the brightness signal component the maximum brightness value and the minimum brightness value are evaluated approximately within one entire frame.

6. The method of claim 2, wherein each image of the image sequence includes two frames, and wherein in the step of continuously evaluating the brightness signal component the maximum brightness value and the minimum brightness value are evaluated approximately within one entire frame.

7. The method of claim 1, wherein the first predetermined image sector and the second predetermined image are identical.

8. The method of claim 1, wherein each image of the image sequence includes two frames, and wherein in the step of continuously evaluating the brightness signal component the maximum brightness value and the minimum brightness value are calculated for every other frame.

9. The method of claim 1, wherein in the step of continuously calculating offset values the offset values are calculated on the basis of differences between the calculated minimum brightness values and a predetermined brightness value corresponding to zero brightness.

10. The method of claim 1, wherein the brightness values which are the basis for the continuous calculation of the offset values are weighted differently.

11. The method of claim 1, wherein the brightness values which are the basis for the continuous calculation of the gain values are weighted differently.

12. The method of claim 1, wherein the brightness values which are the basis for the continuous calculation of the offset values and the brightness values which are the basis for the continuous calculation of the gain values are weighted differently.

13. The method of claim 1, wherein the gain values are calculated on the basis of quotients of a predetermined difference value corresponding to a maximum brightness resolution and differences between the previously calculated maximum brightness values and the associated minimum brightness values.

14. The method of claim 1, wherein at least the step of continuously evaluating the brightness signal component, the step of continuously modifying the brightness signal component and the step of continuously modifying the color signal component are realized by hardware.

15. The method of claim 1, wherein an analog video signal is created from the modified digital video signal to display the image sequences on a color monitor.

16. The method of claim 1, wherein the image sequences acquired with a digital color video camera are such ones of a medical operation in a body cavity, the image sequences being then presented in real-time on a monitor to an operating surgeon.

17. A method of improving a signal in an image sequence acquired with a digital color video camera creating a digital video signal including a brightness signal component and a color signal component, said method comprising the steps of:

smoothing the brightness signal component by calculating an average value of a predetermined number of neighboring picture elements;

continuously evaluating the brightness signal component to calculate maximum brightness values and minimum brightness values within a predetermined image sector and at least for a partial sequence of images;

continuously calculating offset values on the basis of at least two previously calculated minimum brightness values;

continuously calculating gain values based on differences between at least to previously calculated maximum brightness values and the associated minimum brightness values;

continuously modifying the brightness signal component by subtracting the last calculated offset value therefrom and by then multiplying it with the last gain value; and continuously modifying the color signal component by multiplying it with the last calculated gain value and a predetermined weighting factor at least for the predetermined image sector.

18. The method of claim 17, wherein each image of the image sequence includes two frames, and wherein in the step of continuously evaluating the brightness signal component the maximum brightness value and the minimum brightness value are calculated for every other frame.

19. The method of claim 17, wherein in the step of continuously calculating offset values the offset values are calculated on the basis of differences between the calculated minimum brightness values and a predetermined brightness value corresponding to zero brightness.

20. Software for performing a method of improving a signal in an image sequence acquired with a digital color video camera creating a digital video signal including a brightness signal component and a color signal component, the method comprising the steps of:

continuously evaluating the brightness signal component to calculate maximum brightness values and minimum brightness values at least within a first predetermined image sector and at least for a partial sequence of images;

continuously calculating offset values on the basis of at least two previously calculated minimum brightness values;

continuously calculating gain values based on differences between at least to previously calculated maximum brightness values and the associated minimum brightness values;

continuously modifying the brightness signal component by subtracting the last calculated offset value therefrom and by then multiplying it with the last gain value; and continuously modifying the color signal component by multiplying it with the last calculated gain value and a predetermined weighting factor at least for a second predetermined image sector.

21. The software of claim 20, wherein the method further comprises the step of smoothing the brightness signal component before its evaluation by calculating an average value of a predetermined number of neighboring picture elements.

22. The software of claim 20, wherein in the step of continuously evaluating the brightness signal component the maximum brightness value and the minimum brightness value are evaluated within the first image sector.

23. The software of claim 21, wherein in the step of continuously evaluating the brightness signal component the maximum brightness value and the minimum brightness value are evaluated within the first image sector.

24. The software of claim 20, wherein each image of the image sequence includes two frames, and wherein in the step of continuously evaluating the brightness signal component the maximum brightness value and the minimum brightness value are evaluated approximately within one entire frame.

25. The software of claim 21, wherein each image of the image sequence includes two frames, and wherein in the step of continuously evaluating the brightness signal component the maximum brightness value and the minimum brightness value are evaluated approximately within one entire frame.

* * * * *